US006647847B2

(12) United States Patent
Hewitt et al.

(10) Patent No.: US 6,647,847 B2
(45) Date of Patent: Nov. 18, 2003

(54) FENCE

(75) Inventors: Timothy Hewitt, Pleasant Ridge, MI (US); Michael Ursell, Berkley, MI (US)

(73) Assignee: HTC Products, Inc., Royal Oak, MI (US)

( * ) Notice: Subject to any disclaimer, the term of this patent is extended or adjusted under 35 U.S.C. 154(b) by 25 days.

(21) Appl. No.: 10/076,173

(22) Filed: Feb. 14, 2002

(65) Prior Publication Data

US 2002/0108480 A1 Aug. 15, 2002

Related U.S. Application Data

(60) Provisional application No. 60/269,115, filed on Feb. 15, 2001.

(51) Int. Cl.[7] .......... B23D 45/06
(52) U.S. Cl. .......... 83/446; 83/468.7; 83/477.2
(58) Field of Search .......... 83/468.7, 477.2, 83/438, 446; 269/318

(56) References Cited

U.S. PATENT DOCUMENTS

| | | | | |
|---|---|---|---|---|
| 2,267,937 A | * 12/1941 | Mattison | 83/422 |
| 2,273,715 A | * 2/1942 | Lonskey et al. | 83/438 |
| 2,806,493 A | * 9/1957 | Gaskell | 83/438 |
| 5,054,969 A | * 10/1991 | Gibson et al. | 408/115 R |
| 5,181,446 A | * 1/1993 | Theising | 83/438 |
| 5,647,258 A | * 7/1997 | Brazell et al. | 83/438 |
| 5,768,966 A | 6/1998 | Duginske | 83/468.7 |
| 6,293,176 B1 | 9/2001 | Talesky | 7/6 |
| 2002/0050201 A1 | * 5/2002 | Lane et al. | 83/477.2 |

FOREIGN PATENT DOCUMENTS

| | | |
|---|---|---|
| DE | 3606795 | * 9/1987 |
| GB | 692317 | * 6/1953 |

OTHER PUBLICATIONS

Wood Magazine, "Rip Fence Roundup" pp. 54–57, Feb., 1997, Issue No. 95.

* cited by examiner

*Primary Examiner*—Kenneth E. Peterson
(74) *Attorney, Agent, or Firm*—Howard & Howard

(57) ABSTRACT

A fence for guiding a work surface past a saw blade supported by a table having a support tube running substantially perpendicular to the saw blade. The fence includes a rip fence having a plurality of studs disposed on opposing sides thereof. A pair of fence faces are positioned on opposing sides of the rip fence and have a plurality of slots for removably engaging the studs thereby securing the face fences to the rip fence. A rip fence head is affixed beneath the rip fence. A lockdown clasps the support tube with the rip fence head for securing the fence to the tablesaw. The lockdown includes an adjustment mechanism for stabilizing the fence to the support tube independently of the lockdown. The adjustment mechanism is adjustable relative to the lockdown so that the position of the fence on the support tube can be accurately adjusted by moving the fence relative to the lockdown mechanism.

19 Claims, 8 Drawing Sheets

FENCE

This application claims the benefit of provisional application 60/269,115 filed Feb. 15, 2001.

BACKGROUND OF THE INVENTION

This invention relates to an improved fence for a table mounted tool, such as for example a tablesaw, shaper, oscillating spindle sander, band saw, router table, etc. More specifically, the subject invention relates to an improved attachment for securing the fence to a table mounted tool and an improved way of replacing the fence faces or attaching accessory tools. For simplicity and clarity, the present invention will be described with respect to a tablesaw, but it should be understood that it will work well with any table mounted tool.

Fences have become standard equipment for use with most tablesaws to accurately guide a workpiece past a saw blade. Fence faces disposed on the fence must remain oriented parallel to the saw blade even after repeated uses to ensure accuracy and repeatability in the workpiece being cut. Presently available fences include widely varying types of lockdowns to secure the fence to the tablesaw. None of these lockdowns provide the ability to accurately tune the position of the fence relative to the saw blade.

Further, presently available fences do not provide the ability to quickly and easily remove the fence faces without the use of tools. These fence faces also include attachment access points that are exposed to the work area.

Therefore, it would be desirable to provide a fence having a lockdown that is convenient to use and yet provides the ability to obtain an accurate placement of the fence relative to the saw blade. It would be further desirable to provide a fence face that can be easily and quickly removed from the fence.

SUMMARY OF THE INVENTION AND ADVANTAGES

The present invention is a fence assembly for use with a table mounted tool such as a tablesaw. The fence includes a fence beam having opposed fence faces removably attached on opposite sides of the fence beam. A fence head forms an L-shaped section and is mounted to the end of the fence beam. An adjustment mechanism is attached to the fence head and receives the fence support, such as a support tube of the tablesaw.

The fence beam includes a plurality of fasteners mounted along each side. Each fence face includes a plurality of mating fasteners for securing the fence faces to the fence beam. In the preferred embodiment, studs are mounted along each side of the fence beam and a plurality of keyhole shaped slots are mounted on each fence face. The studs and the keyhole shaped slots provide the means to quickly remove and re-attach the fence faces to the fence beam. It should be appreciated that other fasteners could be used, such as for example magnets.

The adjustment mechanism of the present invention allows for both quick general mounting of the fence to the tablesaw and precise adjustment of the fence with respect to the saw blade. The adjustment mechanism includes a quick lockdown device for locking the fence in a generally desired location. To fine tune the adjustment of the fence with respect to the saw blade, an adjustment knob is provided. The adjustment knob can be rotated to move the fence a precise distance for each rotation of the knob. Once the fence is at the desired location, a main fence lockdown lever is depressed to lock the fence in its final position. The main fence lockdown lever includes a cam which engages a locking finger which when engaged by the cam engages the support tube of the tablesaw.

In the disclosed embodiment, the adjustment mechanism has a first mounting assembly which mounts the adjustment knob and a fine threaded shaft to the fence beam. The main fence lockdown device is mounted for movement with respect to the fine tuning mechanism. In this way, the main fence lockdown can be fixed to the support beam and the fence can be adjusted with respect to the support beam.

The fence faces can quickly and easily be replaced by way of the studs and the keyhole shaped slots. The adjustment mechanism and the cam provide the inventive fence with a lockdown that is mechanically simple and yet allows for accurate adjustments to the position of the fence relative to the tablesaw. The simple design of the lockdown enables the fence to provide an accurate and repeatable alignment surface relative to the saw blade that is not presently available.

BRIEF DESCRIPTION OF THE DRAWINGS

Other advantages of the present invention will be readily appreciated as the same becomes better understood by reference to the following detailed description when considered in connection with the accompanying drawings wherein:

FIG. 8 is an end view of the anti rotation tab and nut;

DETAILED DESCRIPTION OF THE PREFERRED EMBODIMENT

Figure 1:
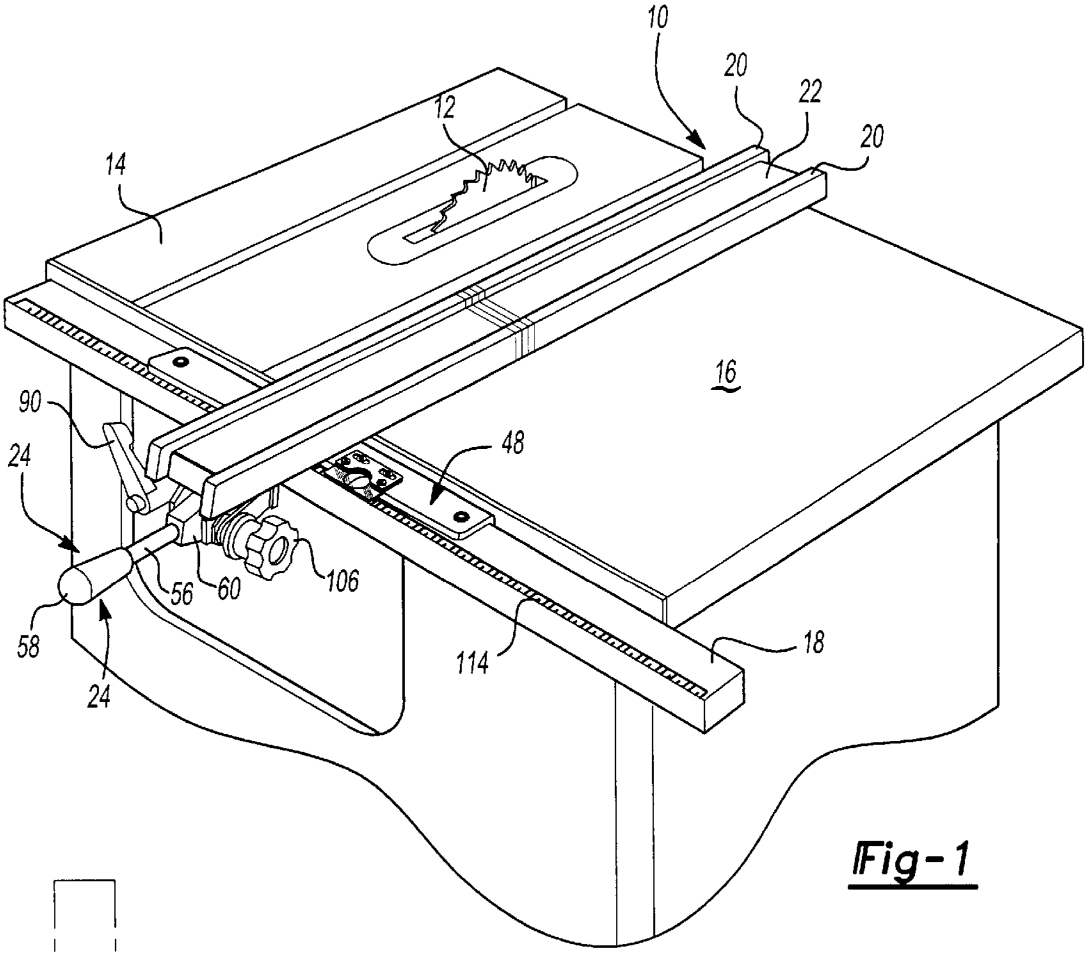
FIG. 1 is a plan view of a tablesaw with the inventive fence.

Referring to FIG. 1, a fence assembly is generally shown at 10. The fence 10 is used for guiding wood against a table mounted tool such as a saw blade 12 of a tablesaw 14. The fence 10 sits upon a work surface 16 of the tablesaw 14 and is aligned parallel to the saw blade 12. The tablesaw 14 includes a support tube 18 that runs perpendicular to the saw blade 14 as known in the art of tablesaws. Fence 10 is removably mounted to support tube 18. The fence 10 includes opposing fence faces 20 that extend upwardly and are removably attached to opposite sides of fence beam 22.

Figure 9:
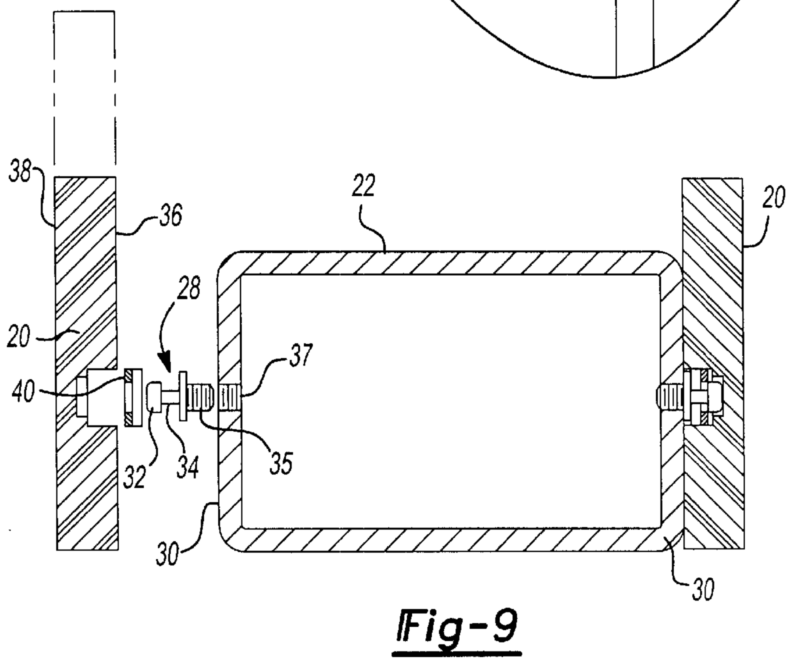
FIG. 9 is an end view of the beam and removable fence faces of the present invention.
Figure 10:
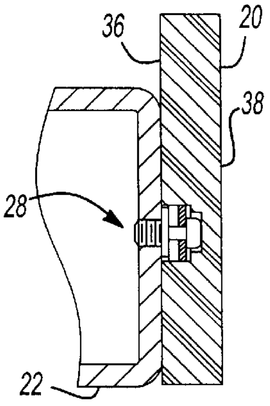
FIG. 10 is a partial end view of the beam with the fence face installed.
Figure 2:
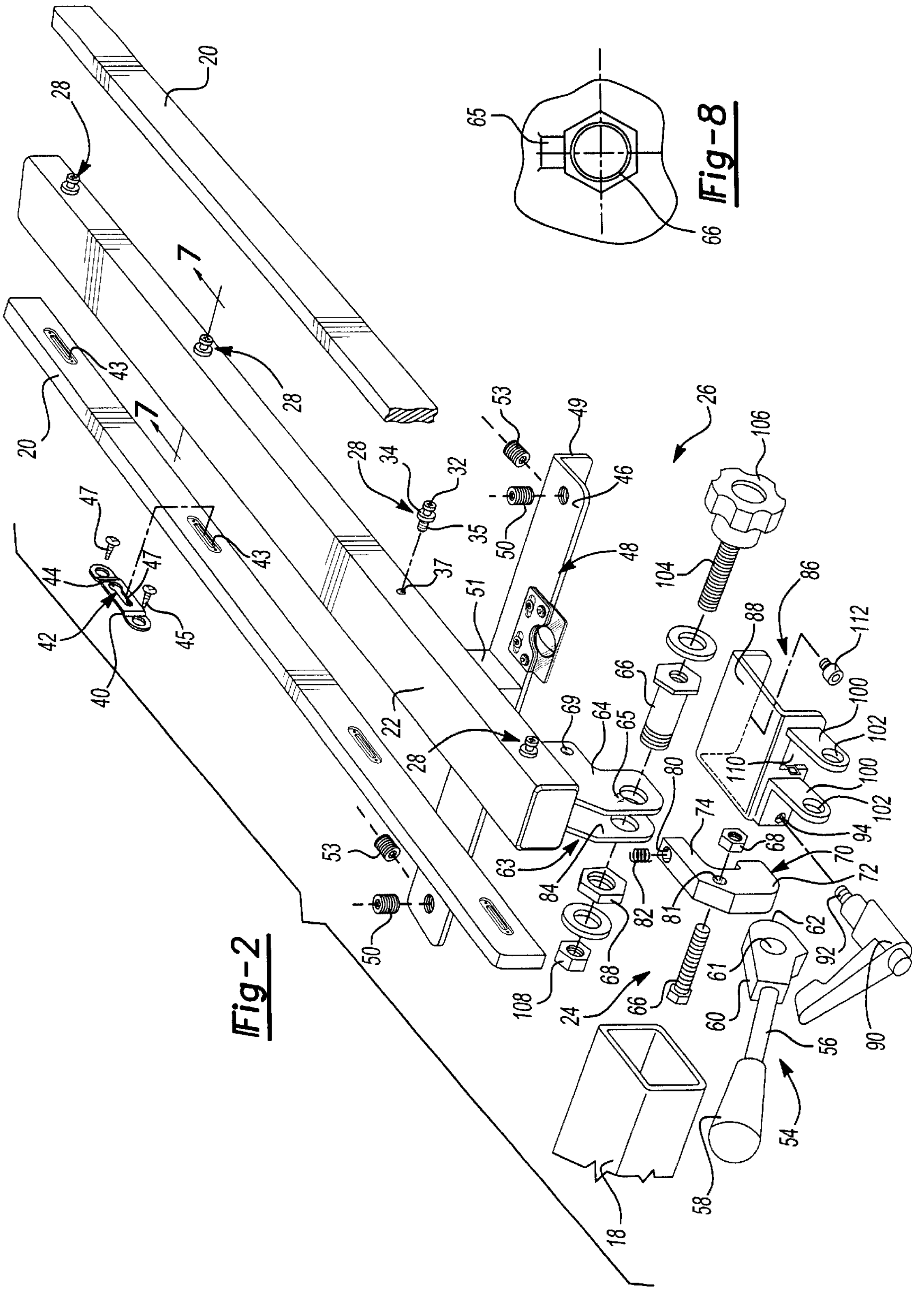
FIG. 2 is a perspective exploded view of the fence of the present invention.

Referring to FIGS. 9 and 10, the preferred embodiment of the fence face 20 is illustrated. The fence faces 20 are removably affixed to opposing sides of the fence beam 22 by a plurality of studs 28 which project outwardly from each beam side 30 of the fence beam 22. Each stud includes a head 32 and a shaft 34. The radius of the head 32 is larger than that of the shaft 34. The shaft 34 extends outwardly from beam side 30 so that the head 32 is distanced from the beam side 30. In the disclosed embodiment, the studs 28 have a threaded portion 35 which threads into an internally threaded hole 37 in beam side 30. Each of the fence faces 20 includes an inner face 36 and an outer face 38. Each inner face 36 includes a plurality of plates 40 which is the preferred embodiment match in number the studs 28 on the fence beam 22. With reference to FIG. 2, each of the plates 40 includes a keyhole shaped aperture 42. The aperture 42 forms a slot having an enlarged end 44 for receiving the stud head 32 and a narrow end 45 for retaining the stud head 32. In the disclosed embodiment, the fence faces have recesses 43 to receive the plates 40 and screws 47 retain the plates 40 in the recesses 43. The fence faces 20 are each affixed to the fence beam 22 by inserting the stud head 32 into the enlarged end 44 of the keyhole shaped aperture 42 and sliding the stud head 32 into the narrow end 45.

The stud 28 and the keyhole shaped aperture 42 enable the quick replacement of the fence faces 20 when worn without having to rotate the fasteners, i.e. without tools. Further, other useful fixtures can be affixed to the fence 10. A sacrificial fence face designed to be sawed through while cutting can be quickly attached. Further, a fence face having a jig attached for providing additional support to a workpiece can be quickly attached. These will be described later. In the preferred embodiments, the fence faces 20 can be constructed of wood, plastic, metal, etc. Additionally, instead of the fasteners described, other non-rotating fasteners could be used such as magnets.

With reference to FIG. 1, it can be seen that fence beam 22 protrudes past the work surface 16. This is an important advantage of the present fence 10 because it allows a work piece to engage more of the fence beam 22 before engaging the saw blade 12. Due to the location of the fence head 26, the advantageous extension can be obtained.

The fence head 26 is best shown in FIG. 2 having a mounting member 48 affixed beneath the fence beam 22. In the disclosed embodiment, a block 51 is welded between the member 48 and beam 22. The mounting member 48 includes a side wall 49 that forms an L-shaped section with the top wall 46. The top wall 46 includes pads 50 for resting against the support tube 18. In the preferred embodiment, the pads are preferably plastic to allow the mounting member 48 to easily slide along tube 18. The side wall 48 also includes at least two resilient panels 52 for squaring the fence head 26 to the tablesaw 14. See FIG. 3. Each resilient panel 52 is adjustably spaced from the side wall 48 by a threaded spacer 53. The spacer 53 can be turned to force the panel 52 against the support tube 18 to square the fence 10 with respect to the saw blade and to adjust the clamping force of the main fence lock 24. Additionally, the panel 52 is offset to provide space between tube 18 and mounting member 48 to provide room for the saddle 86 which will be discussed in greater detail below.

As best shown in FIGS. 1, 2, 4, and 7, the main fence lockdown assembly 24 includes a handle 54 with a shaft 56 having a grip 58 affixed at a distal end thereof. The shaft 56 extends opposite the grip 58 to a generally circular cam 60 that includes a cam surface 62. The cam 60 is pivotally attached between opposing walls 64 and 84 of the bracket 63 with a threaded shaft 66 and a nut 68 that define the axis on which the cam 60 pivots. A tab 65 is provided to prevent the threaded shaft 66 from rotating. The cam 60 has an aperture 61 which receives the shaft 66. The orientation of the cam surface 62 is changed by moving the handle 54 up or down. The cam 60 contacts a locking arm or finger 70 that includes a cam appendage 72 and a spring appendage 74.

The cam appendage 72 and the spring appendage 74 form an L-shaped section. A locking arm bolt 66 and nut 68 affix the locking arm 70 to the bracket 63 by extending through an aperture 81 in arm 70 and aperture 69 in opposing walls 64 and 84 of bracket 63. The locking arm 70 pivots on the locking arm bolt when the cam surface 62 is forced against the cam appendage 72. The cam surface 62 forces the cam appendage 72 against the support tube 18. The spring appendage 74 includes a bore 80 for receiving a spring 82. The spring 82 is disposed between the spring appendage 74 and the bottom of the fence beam 22. When the cam surface 62 is pivoted away from the cam appendage 72, the spring 82 forces the locking arm to a released position. This allows the fence 10 to slide freely upon the support tube 18. Conversely, when handle 54 is pressed down, cam surface 62 engages cam appendage 72 forcing it against support tube 18 to lock the fence 10 with respect to support tube 18. It should be appreciated that bracket 63 is illustrated with opposing walls 64 and 84, but that it could have only one wall.

The lockdown assembly 24 also includes a micro adjust saddle 86. The saddle 86 includes a generally u-shaped bracket 88 which fits over the support tube 18. The bracket 88 can slide along the support tube 18 to allow general positioning of the fence 10 on the tablesaw 14. A spring loaded quick lock lever 90 is provided to quickly lock the saddle 86 in position on tablesaw 14.

Figure 3:
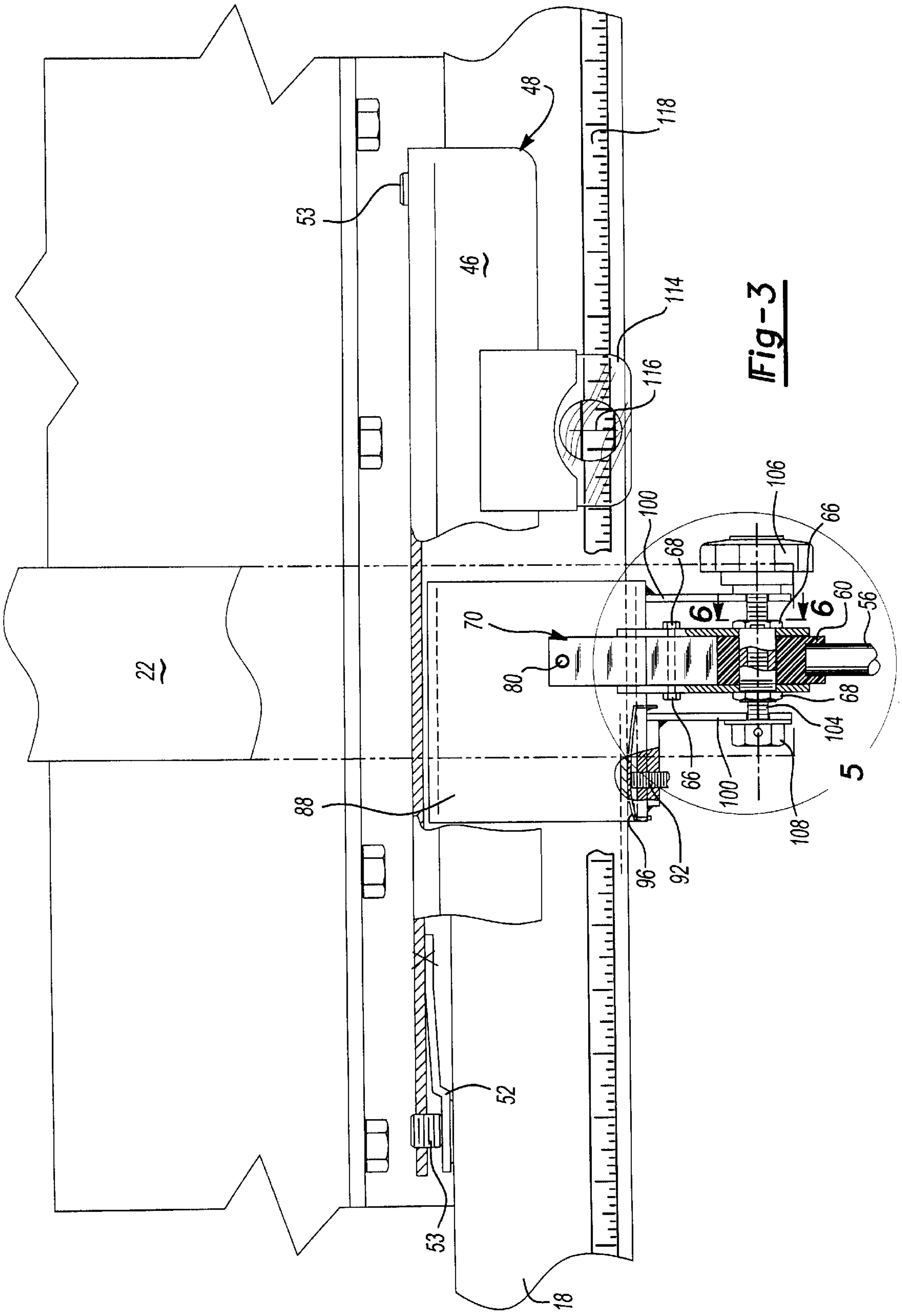
FIG. 3 is a partial top view of the fence with cut away views.
Figure 4:
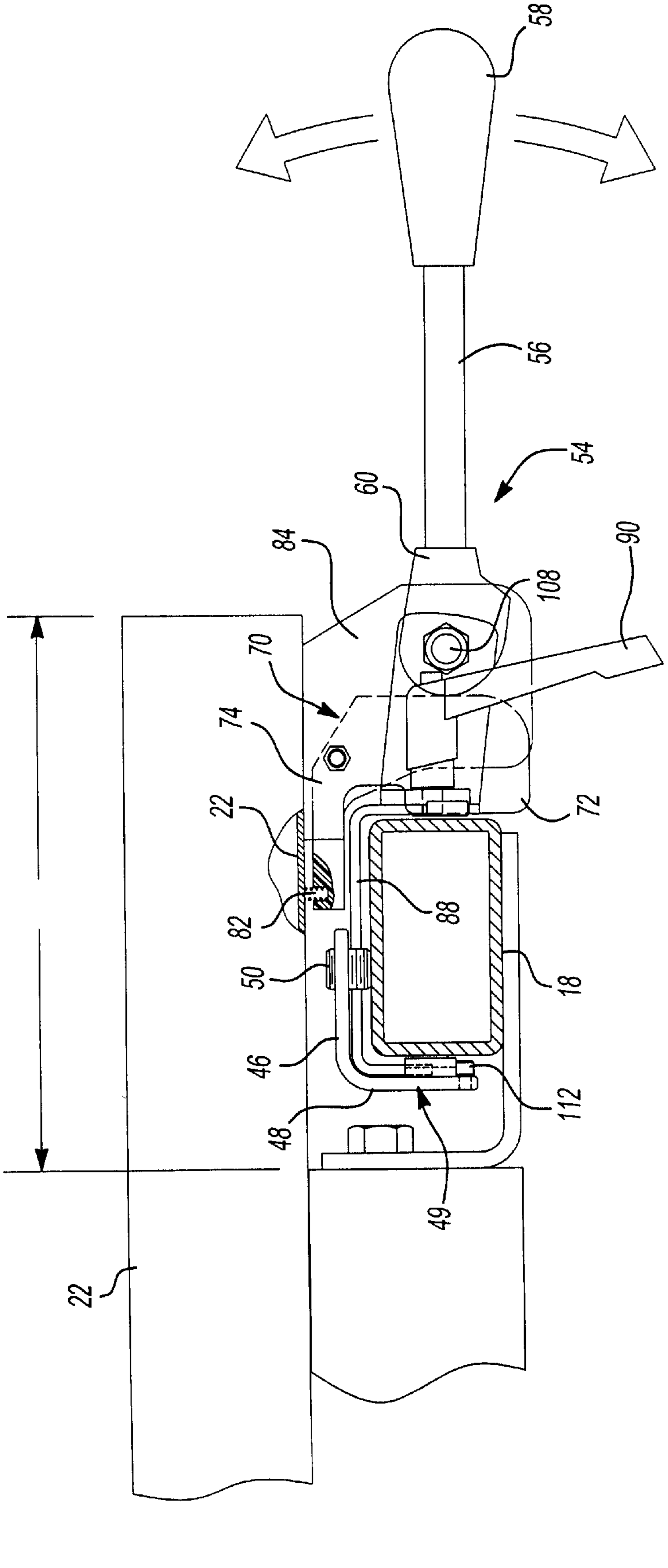
FIG. 4 is a side view of the quick lock lever and the main fence lock.
Figure 6:
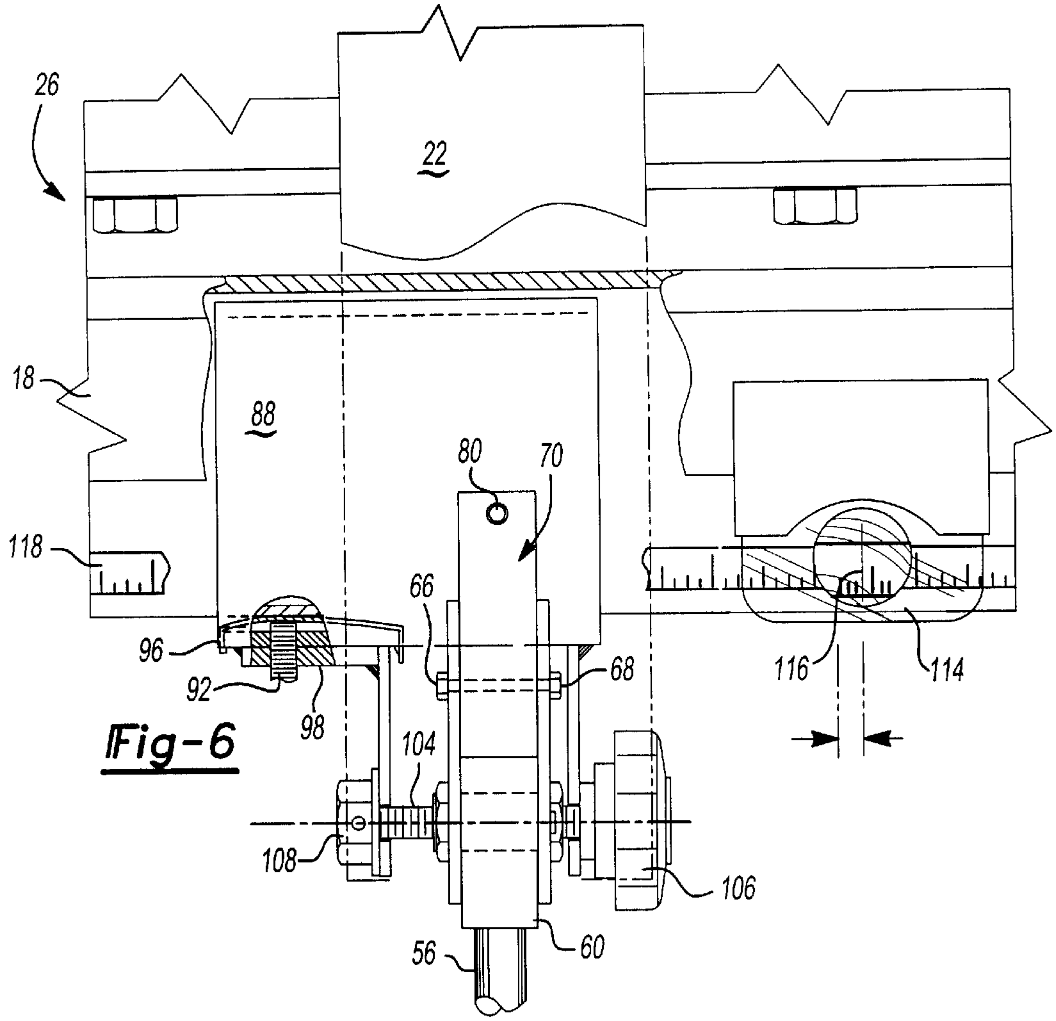
FIG. 6 is a partial top view of the fence with cut away views.

In the disclosed embodiment, the lever 90 has a threaded shaft 92 which threads into internally threaded aperture 94 to engage a flexible strip 96, see FIGS. 3 and 6. The shaft 92 is threaded through a plate 98 which is attached to the saddle 86 to provide additional material for receiving the shaft 92.

The saddle 86 is mounted to the fence 10 through mounting ears 100. Each of the mounting ears 100 have a mounting aperture 102 which receives threaded shaft 66. As illustrated, the mounting ears 100 are spaced apart so that the opposing walls 64 and 84 of bracket 63 fit between ears 100.

Micro adjustment shaft 104 mounts the saddle 86 to the fence 10. In particular, the shaft 104 is inserted through one ear 100 threaded through the arm bolt 66 and through the other ear 100. A knob 106 is attached to one end of the shaft 104. The knob 106 and nut 108 engage the ears 100 so that when knob 106 is rotated, the fence beam 22 is moved with respect to the saddle 86 and with respect to the saw blade 14. In this way, the fence beam can be precisely adjusted with respect to the saw blade 14. The adjustment precision is dependent upon the threads per inch of the shaft 104. In the preferred embodiment there are 16 threads per inch. One fall turn of the knob 106 moves the fence beam 22 1/16" with respect to the saw blade 14. One half turn moves the beam 22 1/32", 1/4 turn 1/64 inch, 1/8 turn 1/128". As will be appreciated, very fine micro adjustments are obtained.

As illustrated in FIG. 2, the saddle 86 has an opening 110 which receives the cam appendage 72. Once the precise location of fence beam 22 is obtained, the main fence lock 54 can be depressed to engage cam appendage 72 against the support tube 18. With the cam appendage 72 engaged against the support tube 18, the fence 10 is locked in place.

With reference to FIG. 2, a flat head machine bolt 112 is provided in the side wall 49 opposite the cam appendage 72 to support the saddle 88.

With respect to FIGS. 1, 2, 3 and 6, a lens 114 is affixed to the fence head 26. The lens 114 includes a score 116 or sight mark that can be used to identify the position of the fence 10 on the support tube 18 if the support tube 18 is incrementally marked. In the preferred embodiment, a ruler 118 is affixed to the support tube 18 to facilitate accurate positioning.

Figure 5:
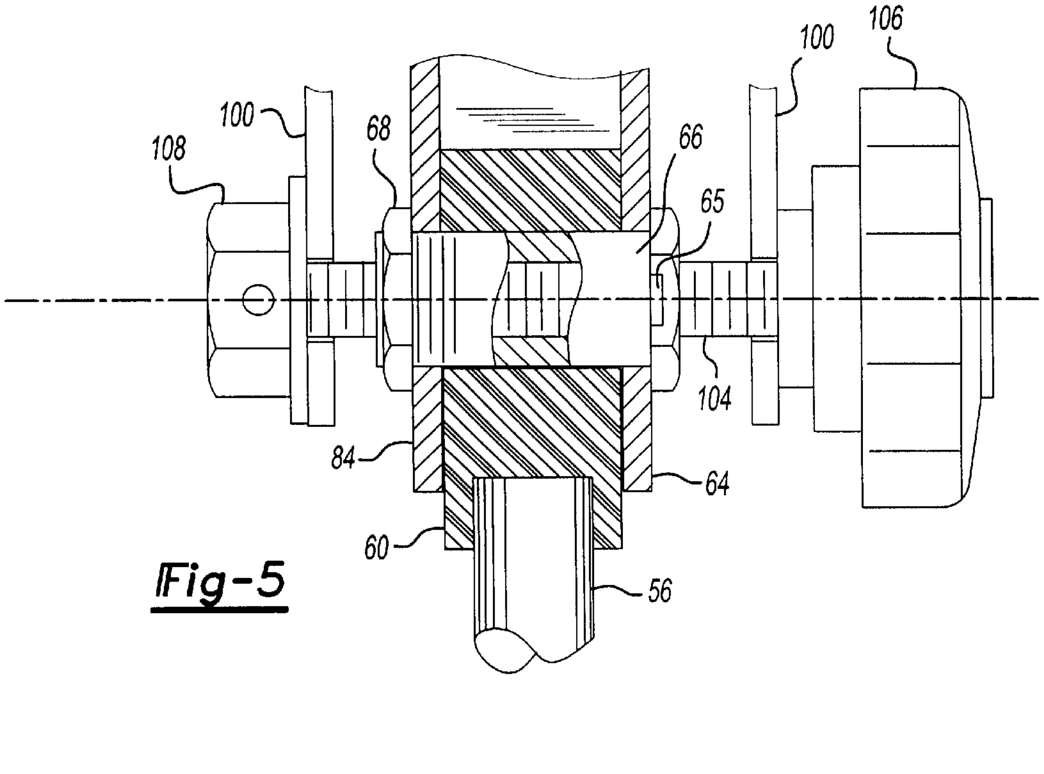
FIG. 5 is a partial cut away view of the fine adjustment mechanism.
Figure 7:
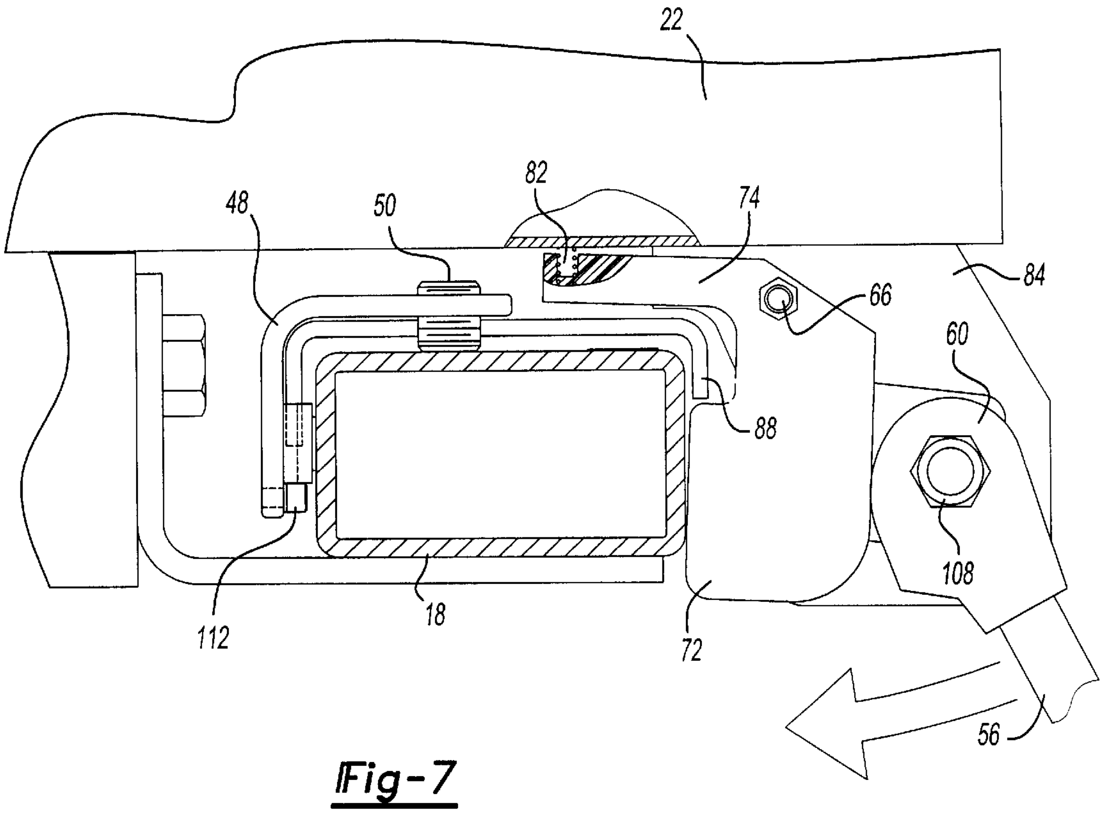
FIG. 7 is a partial view of the main fence lock in the locked position.

In use, the fence 10 of the present invention is mounted on the support tube 18 by placing saddle 86 over support tube 18 and placing mounting member 48 upon the support tube 18. The fence can then be moved along the longitudinal axis of support tube 18 to either increase or decrease the distance between the side of the fence beam 22 and the tool 12. With reference to FIG. 1, the fence 10 can be moved across the work surface 16 and its distance from the saw blade 12 can be determined by the ruler 114 mounted to the support tube 18. Once the fence is the appropriate distance from blade 12, the quick lock lever 90 is rotated to thread the threaded shaft 92 into engagement with the support tube 18. This can be seen in FIGS. 4 and 5. As disclosed, there is a flexible strip 96 which facilitates the locking of the fence 10 to the support beam 18 and prevents marring of the support beam 18.

Once the general placement is determined, the distance between the saw blade and fence can be fine tuned by rotating knob 106 on micro adjustment shaft 104. As shown in FIG. 6, rotation of the knob 106 will move the fence beam 22 in very small increments with respect to the blade 12. Once the fence is properly aligned, then the main fence lock 24 can be depressed engaging the cam appendage into engagement with the support tube 18 to finally lock the fence in place. See FIG. 7. It should be understood, that the fence would function without the need for the main fence lock, but there could be the potential for movement of the fine adjustment by inadvertent engagement with knob 106. Further, the main fence lock 24 provides more substantial locking of the fence with respect to the support beam.

As also will be understood by the above description, the fences 20 can be readily replaced by tapping the ends of the fences in the direction of the enlarged end 44. When the enlarged ends 44 are in position over the heads 32, the fences can be removed and replaced with either new fences or jigs etc. for whatever operation is being conducted by the user.

Figure 11:
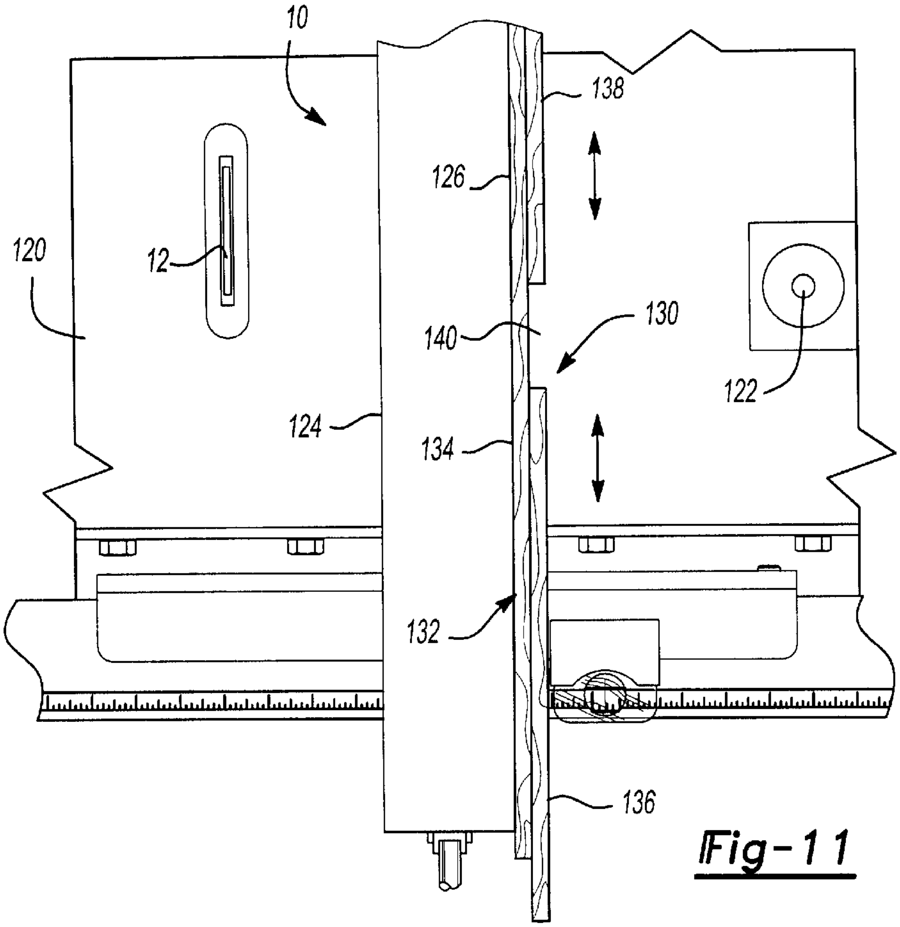
FIG. 11 is a top view of an example of a jig or accessory tool, a split type fence, mounted on a combination tablesaw and router table.

With reference to FIG. 11, the fence assembly of the present invention is shown on a combination tablesaw and router table 120. The combination tablesaw and router table 120 has a saw blade 12 and a router 122. The fence assembly 10 is especially useful for this type of table mounted tool because both sides of beam 22 can be used, one side 124 for guiding a workpiece to the saw blade 12 and the other side 126 for guiding a workpiece to the router 122. The fence assembly 10 is also especially suited for this application because an accessory tool or jig 130 can be quickly mounted to either side 124 or 126; in this illustration it is mounted to side 126.

Figure 12:
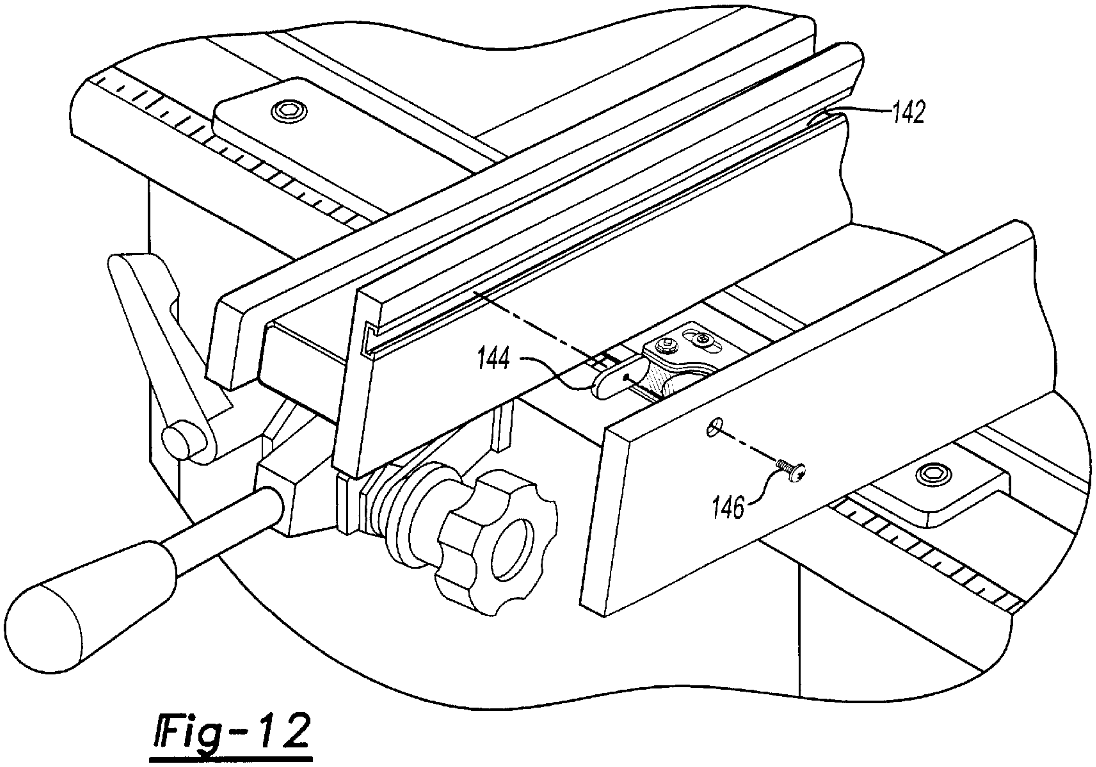
FIG. 12 is a partial exploded view of the jig of FIG. 11.

As illustrated in FIGS. 11 and 12, the accessory tool 130 is a split type fence 132. The split type fence 132 has a base 134 and two sliding guides 136 and 138. The sliding guides 136 and 138 can be slid with respect to one another to form a gap 140. The gap 140 receives the cutter blade of the router 122 so that when a workpiece is slid along the guides 136 and 138, the cutter blade can precisely cut the workpiece.

With reference to FIG. 12, the disclosed method of mounting the guide 136 to the base 134 is illustrated. The base 134 has a slot 142 which receives a slide 144 which is mounted to the guide 136 by a screw 146. It should be appreciated that the base 134 is mounted to the beam 22 with the fasteners disclosed in the present invention. In the preferred embodiment, the fasteners used are the studs 28 and keyhole slot plate 40.

Figure 13:
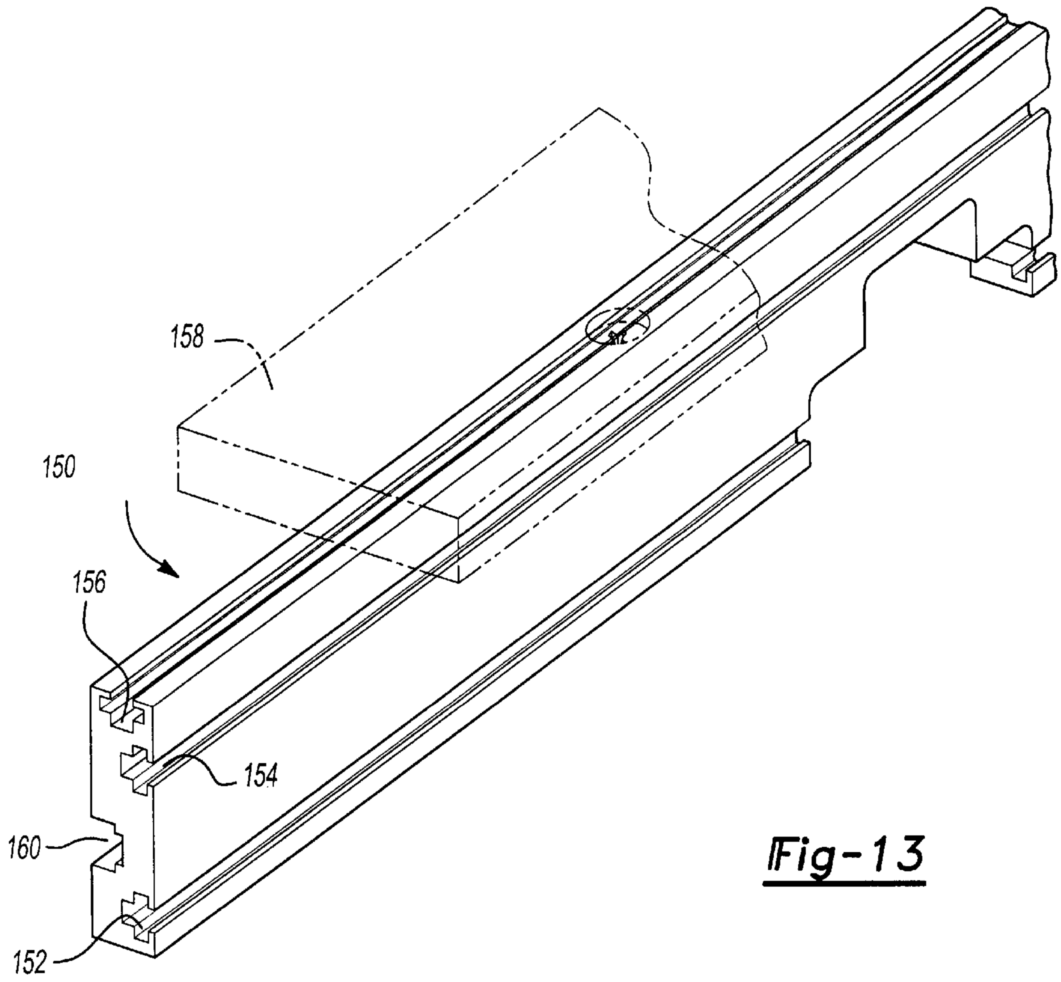
FIG. 13 is a partial perspective view of a further jig or accessory tool, a fixture base.

Referring now to FIG. 13, a fixture base 150 is disclosed. Base 150 has a plurality of channels 152, 154, 156 and 158 which receive fasteners of various types to which jigs 158 of various type can be mounted.

A fence mounting slot 160 is provided for receipt of a fastener to fasten the fixture base 150 to the fence beam 22. In the preferred embodiment, the slot 160 receives a keyhole plate 40. The plate 40 is fastened into slot 160 with screws. In this way, the base 150 can be quickly and easily mounted to the beam 22 over studs 28 without the use of tools.

Figure 14:
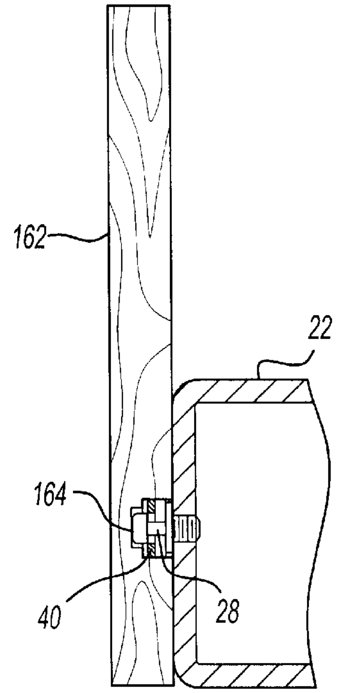
FIG. 14 is an end view of a still further jig or accessory tool, an extended fence.

With reference to FIG. 14, a still further accessory tool 162 is disclosed. Accessory tool 162 is an extended fence for handling larger workpieces. As with the fence face, the extended fence 162 has a cavity 164 for receipt of a plate 40. The plate 40 is then mounted to the fence beam 22 by the studs 28.

It should be appreciated by those of ordinary skill in the art that the above disclosed accessory tools are merely an example of various accessories which could be used. It is not the intention of applicant to in any way limit patent protection to the specific examples above, but to show the variety of accessories that can be used. The fence assembly 10 of the present invention is virtually a universal base for any number of attachments.

The invention has been described in an illustrative manner, and it is to be understood that the terminology which has been used is intended to be in the nature of words of description rather than of limitation.

Many modifications and variations of the present invention are possible in light of the above teachings. It is, therefore, to be understood that reference numerals are merely for convenience and are not to be in any way limiting and that the invention may be practiced otherwise than as specifically described.

What is claimed is:

1. A fence for use on a table mounted tool, said table mounted tool having a flat work surface and a tool positioned approximate the flat work surface and a fence support to mount it adjacent the work surface;

said fence comprising:

a fence beam having a proximal and distal end and a fence head mounted to said proximal end, said fence head being perpendicular to said fence beam, said fence beam being adapted to extend across at least a portion of the work surface past the tool, said fence head being adapted to be mounted upon the fence support;

said fence beam having a bracket extending outwardly from said proximal end, said bracket having an opening;

said fence head having a mounting member adapted to engage and slide upon the fence support;

a saddle adapted to engage said fence support mounted adjacent said mounting member, said saddle having a pair of mounting ears, each mounting ear having an aperture;

a first lock for locking said saddle to said fence support, a second lock for locking said fence beam to said fence support, said second lock being mounted to said bracket by at least a first connector, said first connector having an internally threaded bore for receipt of an externally threaded shaft, said shaft extending through said mounting ears and through said bore;

said fence beam being adjustable with respect to said saddle by rotation of said threaded shaft.

2. The fence of claim 1, wherein said second lock includes a locking arm pivotally mounted to said bracket through a second connector, and a cam, said cam being pivotally mounted to said bracket through said first connector, said cam being adapted to cam against said locking arm to force said locking arm into said support tube.

3. The fence of claim 1, wherein said saddle has a slot for receipt of said second lock.

4. The fence of claim 2, wherein said saddle has a slot for receipt of said locking arm.

5. The fence of claim 2, further including a spring biasing said locking arm away from said support tube.

6. The fence of claim 1, wherein said first connector is fixed against rotation.

7. The fence of claim 1, further including adjustment screws to align said mounting member with respect to said work surface.

8. The fence of claim 1, wherein said fence beam proximal end extends past said fence head and fence support.

9. The fence of claim 1, further including resilient panels mounted to said mounting member and being adjustable with respect to the fence support to align said fence with respect to said fence support and said tool and to provide clearance space for said saddle with respect to said fence support and said mounting member.

10. A fence for use on a table mounted tool, said table mounted tool having a flat work surface and a tool positioned approximate the flat work surface and a fence support to mount it adjacent the work surface;

said fence comprising:

a fence beam having a proximal and distal end and fence head mounted to said proximal end, said fence head being perpendicular to said fence beam, said fence beam being adapted to extend across at least a portion of the work surface past the tool, said fence head being adapted to be mounted upon the fence support;

said fence beam having a bracket extending outwardly from said proximal end said bracket having an opening;

said fence head having a mounting member adapted to engage and slide upon the fence support;

a saddle adapted to engage said fence support mounted adjacent said mounting member, said saddle having a pair of mounting ears, each mounting ear having an aperture;

a first lock for locking said saddle to said fence support, a first connector extending through said bracket, said first connector having an internally threaded bore for receipt of an externally threaded shaft, said shaft extending through said mounting ears and through said bore; said fence beam being adjustable with respect to said saddle by rotation of said threaded shaft.

11. The fence of claim 10, further including a second lock for locking said fence beam to said support tube, said second lock being mounted to said bracket by at least said first connector.

12. The fence of claim 11, wherein said second lock includes a locking arm pivotally mounted to said bracket through a second connector, and a cam, said cam being pivotally mounted to said bracket through said first connector, said cam being adapted to cam against said locking arm to force said locking arm into said support tube.

13. The fence of claim 10, wherein said saddle has a slot for receipt of said second lock.

14. The fence of claim 12, wherein said saddle has a slot for receipt of said locking arm.

15. The fence of claim 12, further including a spring biasing said locking arm away from said support tube.

16. The fence of claim 10, wherein said first connector is fixed against rotation.

17. The fence of claim 10, further including adjustment screws to align said mounting member with respect to said work surface.

18. The fence of claim 10, wherein said fence beam proximal end extends past said fence head and fence support.

19. The fence of claim 10, further including resilient panels mounted to said mounting member and being adjustable with respect to the fence support to align said fence with respect to said fence support and said tool and to provide clearance space for said saddle with respect to said fence support and said mounting member.

* * * * *